US011777921B2

(12) United States Patent
Valites et al.

(10) Patent No.: US 11,777,921 B2
(45) Date of Patent: *Oct. 3, 2023

(54) SYSTEMS AND METHODS FOR CONTROLLING PERSONAL INFORMATION ON ONLINE SERVICES

(71) Applicant: Ensconce, LLC, San Francisco, CA (US)

(72) Inventors: Matthew C. Valites, San Francisco, CA (US); Jeffrey Bryan Bollinger, Mars Hill, NC (US); Ian Anders Halvorsen, San Francisco, CA (US)

(73) Assignee: Ensconce, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,109

(22) Filed: Nov. 1, 2021

(65) Prior Publication Data
US 2022/0052991 A1 Feb. 17, 2022

Related U.S. Application Data

(63) Continuation of application No. 16/294,787, filed on Mar. 6, 2019, now Pat. No. 11,218,469.

(60) Provisional application No. 62/639,453, filed on Mar. 6, 2018.

(51) Int. Cl.
*H04L 29/06* (2006.01)
*H04L 9/40* (2022.01)
*G06F 21/62* (2013.01)

(52) U.S. Cl.
CPC ........ *H04L 63/083* (2013.01); *G06F 21/6245* (2013.01)

(58) Field of Classification Search
CPC ..... H04L 63/083; H04L 63/102; H04L 63/20; H04L 63/08; G06F 21/6245
USPC .......................................................... 726/7
See application file for complete search history.

(56) References Cited

U.S. PATENT DOCUMENTS

2005/0044423 A1\* 2/2005 Mellmer ............... H04L 63/104
726/4
2019/0253431 A1\* 8/2019 Atanda ................... G06F 21/62

\* cited by examiner

*Primary Examiner* — Jeffrey C Pwu
*Assistant Examiner* — Nega Woldemariam
(74) *Attorney, Agent, or Firm* — Polsinelli PC

(57) ABSTRACT

Systems and methods for management and configuration of personal digital privacy and security. A list of protected accounts is received, where each protected account is an online user account associated with a user. For each protected account of the list, a privacy configuration is generated, based at least in part on one or more user-specific privacy rules. A login session for the protected account is accessed, without transmitting or receiving the user's password for the protected account. Based on the accessed login session for the protected account, a plurality of current status indicators are determined for a plurality of privacy settings associated with the protected account. The current status indicators are analyzed to generate updated configuration settings for one or more of the privacy settings of the protected account, and the updated configuration settings are applied to the protected account.

20 Claims, 9 Drawing Sheets

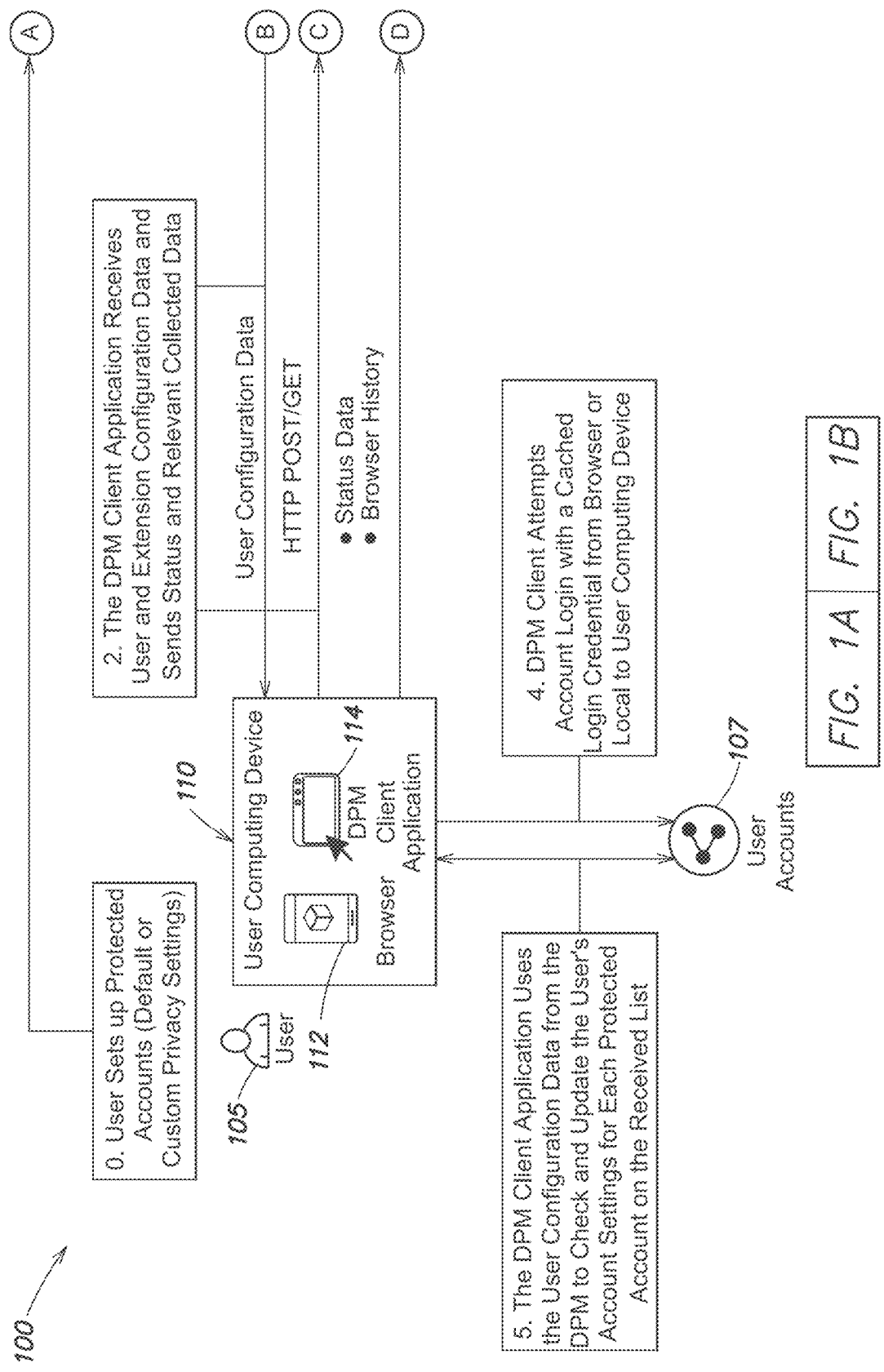

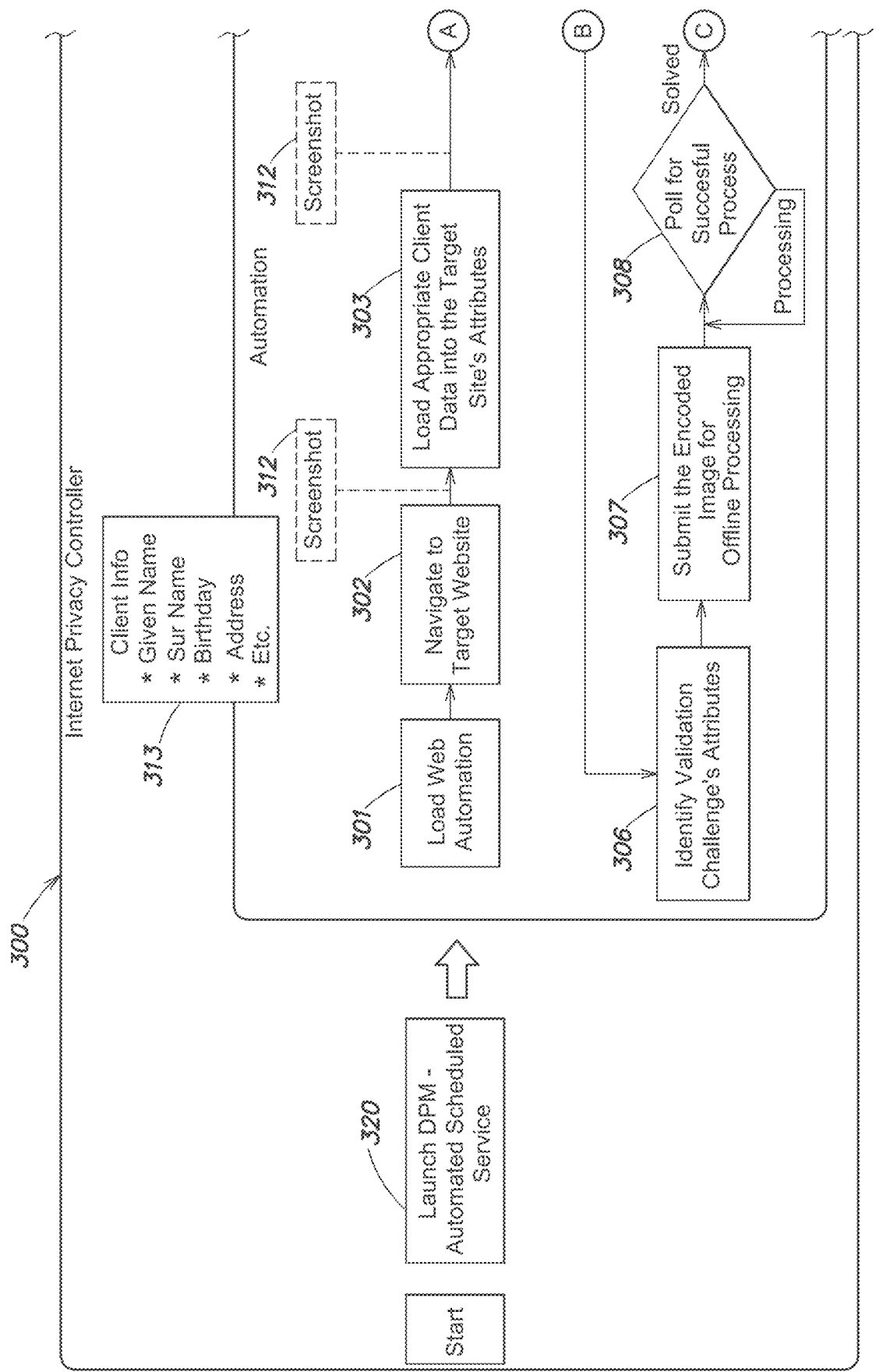

| Protective Domain | Domain Score | Total Score |
|---|---|---|
| OPSEC | 7 | |
| NETSEC | 6 | 27 |
| DEVSEC | 8 | |
| Privacy | 6 | |

Jane Doe

FIG. 5

SYSTEMS AND METHODS FOR CONTROLLING PERSONAL INFORMATION ON ONLINE SERVICES

CROSS-REFERENCE TO RELATED APPLICATIONS

This application is a continuation of U.S. Non-Provisional application Ser. No. 16/294,787, filed Mar. 6, 2019, which claims the benefit of U.S. Provisional Application Ser. No. 62/639,453 filed Mar. 6, 2018, which are hereby incorporated by reference in their entirety.

TECHNICAL FIELD

The present technology pertains to personal privacy on the Internet and more specifically pertains to using a Digital Privacy Management (DPM) infrastructure including a client application and Endpoint Control Process to monitor and configure security and privacy settings.

BACKGROUND

Users routinely interact with websites and online services that contain accounts or profiles of users, particularly social media sites. Each site can have their own options for managing digital security and privacy. There is no ideal broker for ensuring configuration consistency across disparate sites. Improper settings can lead to data theft, unwanted exposure, unauthorized access, or other unforeseen consequences. Sites that collect information on individuals rely on users to set appropriate policies despite the sites ever-changing platform updates. Most users are not aware of the ramifications and downstream effects of setting or not setting controls on their privacy and security. Often the realization of impact occurs after a breach of their personal information has occurred. Automated central management of a user's site settings is challenging due to authentication requirements (e.g. access to an authenticated session, etc.) and the same-origin policy (e.g. a web browser permits scripts contained in a first web page to access data in a second web page, but only if both web pages have the same origin.)

In addition to potential data exposure through online profiles, many online data brokers, advertisers, or marketers re-sell personal information of millions of people including names, addresses or previous addresses, phone numbers, family members, and other personally identifiable information (e.g., on Internet websites, etc.). While not all information can be removed, many services offer opt-out features to de-list personal information. Software can automate the process of limiting or preventing user data exposure from online services to protect privacy.

Measuring the impact of security controls on online security and privacy provides insight into personal information risk. Personal risk can be measured through threat modeling. An appropriate risk management framework can be used to protect a user based on their threat model and scoring systems can be applied to further quantify a user's personal risk.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 1A-B illustrate an example client application and backend of a digital privacy management system;

FIG. 3A-B illustrate an example digital privacy management method of the present disclosure;

FIG. 5 depicts a table illustrating an example protective domain concept and an example security and privacy score.

DESCRIPTION OF EXAMPLE EMBODIMENTS

Figure 1B:
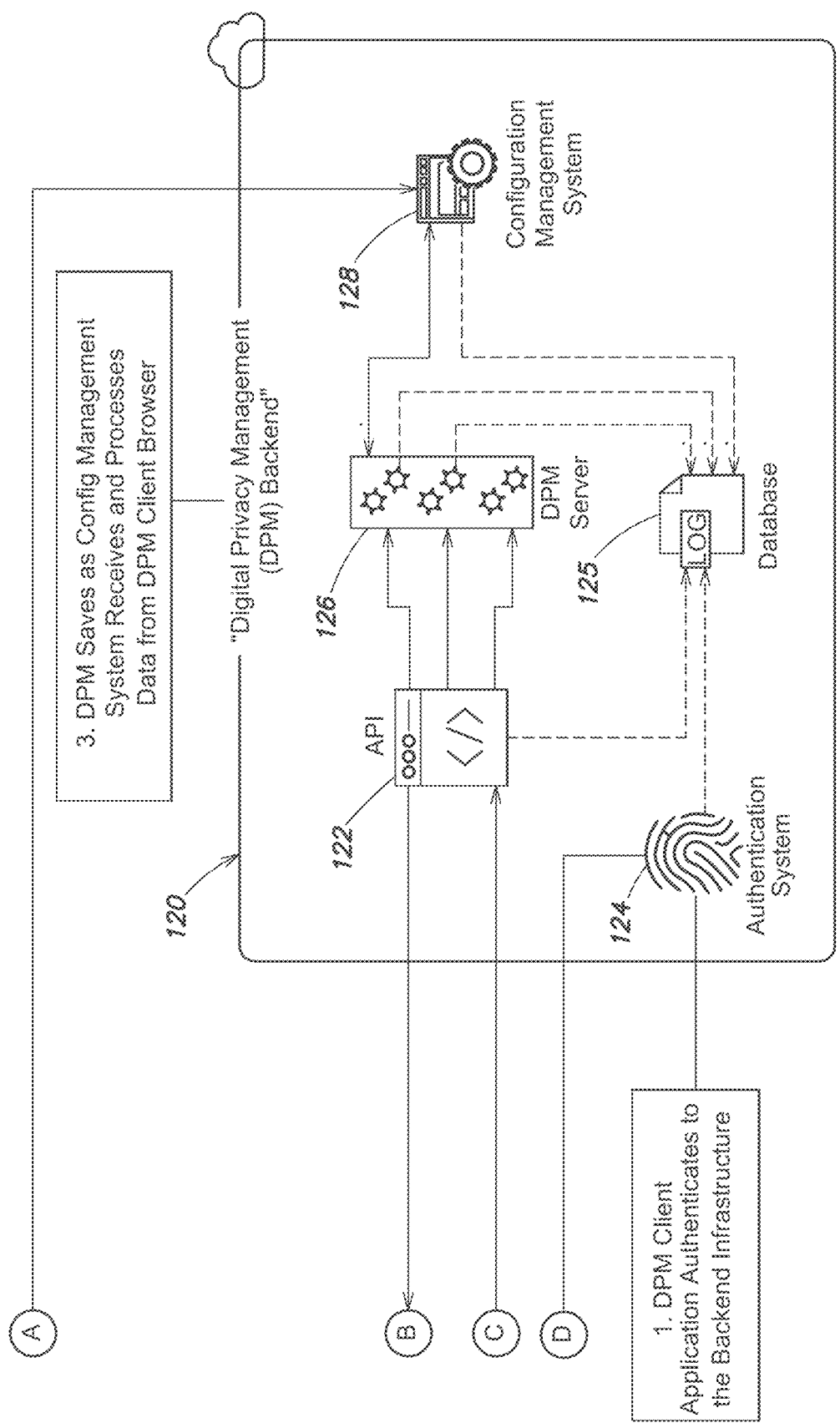

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations described herein.

Various examples of the disclosure are discussed in detail below. While specific implementations are discussed, it should be understood that this is done for illustration purposes only. The terms "e.g." and "i.e." are used to show specific examples for illustration and contextual purposes only and should not be considered limiting. As such, specific examples are not limiting, but merely provide a contextual basis for present disclosure. The present disclosure also includes the use of one or more of the examples, but not other ones of the examples. A person skilled in the relevant art will recognize that other components and configurations may be used without parting from the scope of the disclosure.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods and processes for a digital privacy management infrastructure, endpoint software for optimizing online privacy, and an accurate risk measurement system. The systems can have a reliable backend for maintenance and updating of security and privacy settings on websites where personal information may be shared or have potential for undesired data loss or exposure. By centrally controlling user site settings via local software, the systems and methods solve the same-origin and the authentication problems. By not having direct access to credentials, a user is not exposed to any additional risk. Users can identify their threat models and ensure consistency of controls appropriate to their specific threat model across their digital profile. The disclosed technology addresses the need for effective and scalable management of personal digital privacy and security. Disclosed are systems, methods, interactions and components of client applications and backend systems for management of personal digital privacy and security. The disclosure now turns to an introductory discussion of the digital privacy management (DPM) infrastructure and its interaction with the endpoint mechanisms through the software application.

FIGS. 1A-B depict an example digital privacy management (DPM) system 100, which utilizes a DPM backend 120 and a DPM client application 114 to provide automated management and configuration of privacy settings for a plurality of user accounts 107. The user accounts 107 can include, but are not limited to, various online accounts and profiles, such as social media accounts, email accounts, professional networking accounts, online dating accounts, banking accounts, vendor or e-commerce accounts, etc. The plurality of user accounts 107 are each associated with one or more privacy or security settings that allow the user to modify various aspects of the user account. For example, a privacy setting might control the degree to which a social media account is openly accessible to or viewable by the public, while a security setting might control the frequency with which the account password must be changed or whether two-factor authentication must be used. A given privacy or security setting may provide only binary granularity in which the setting is either selected to be ON or OFF, while other privacy and security settings might accept an open-ended range of inputs.

More generally speaking, there is no consistent standard by which different types of online user accounts implement the same selection of privacy and security settings, and moreover, there is no consistent standard that governs the particular manner in which a given privacy or security setting can be adjusted. Accordingly, it would be desirable to provide an automatic and adaptable solution for consistent management and configuration of personal digital privacy and security settings across a disparate selection of online user accounts.

As seen in FIG. 1A, the DPM client application 114 is provided on a user computing device 110. User computing device 110 includes, but is not limited to, a mobile computing device, a mobile phone, a tablet, a laptop computer, a desktop computer, a wearable computer or computing device, etc. Also provided on user computing device 110 is an internet browser 112, which a user 105 can utilize to login to and interact with one or more of his online user accounts 107. In some embodiments, DPM client application 114 and internet browser 112 can be integrated or otherwise provided as a single component or single application running on user computing device 110. For example, in addition to the functionalities ascribed to DPM client application 114 below, DPM client application 1114 may also include the entirety of the browsing functionalities ascribed to internet browser 112.

In some embodiments, DPM client application 114 and internet browser 112 remain distinct applications running on user computing device 110 but are designed to closely integrate with one another. For example, DPM client application 114 can be configured as an extension or add-on that is compatible with internet browser 112 or otherwise able to be installed on top of internet browser 112. For purposes of the discussion below, an example is considered in which DPM client application 114 is indeed a browser extension that is integrated with internet browser 112, although it is appreciated that this example is for purposes of illustration and is not meant to be construed as limiting the relationship between DPM client application 114 and internet browser 112. For example, DPM client application 114 can alternatively or additionally be provided as a desktop application, a mobile application, a web application, a plug-in, a browser extension, etc., without departing from the scope of the present disclosure.

In order for DPM client application 114 (and DPM backend 120) to perform the personal digital privacy and security management of the present disclosure, DPM client application 114 must be able to access the user accounts 107 that are to be managed (also referred to herein as the user's "protected accounts 107" or "protected online accounts 107"). While it would be possible for DPM client application 114 to obtain the requisite access to the user's protected accounts 107 by simply storing the corresponding login credentials (e.g. username and password) for each one of the protected accounts 107, such an approach raises privacy concerns from the user standpoint and security concerns from the standpoint of DPM system 100. More particularly, privacy concerns would likely arise because users who seek to utilize DPM system 100 will be unwilling to provide a master list of login credentials for the very same online accounts 107 that the user seeks to protect in the first place.

Therefore, rather than directly obtaining login credentials for the user's protected online accounts 107, DPM client application 114 makes use of cached login credentials that are stored by internet browser 112 whenever user 105 utilizes browser 112 to login to one of the protected online accounts 107. It is for this reason that the aforementioned relationship between DPM client application 114 and internet browser 112 is important (e.g. as discussed above, the two might be combined into a single software package, or DPM client application 114 is a browser extension installed on top of internet browser 112).

Because DPM client application 114 makes use of cached login credentials stored by internet browser 112, the actual login credentials (username and/or password) corresponding to the protected user accounts 107 are never actually visible to DPM client application 114, and instead remain opaque throughout the personal digital privacy and security management process of the present disclosure. Additionally, the cached login credentials remain locally stored on user computing device 112 and are not transmitted by DPM client application 114 to DPM backend 120. DPM client application 114 authenticates with authentication system 124, and in response, DPM backend 120 instructs DPM client application 114 to use cached login credentials stored by browser 112 to thereby access each account in the user's list of protected online accounts 107. Upon accessing a protected account, the instructions transmitted by DPM backend 120 further cause DPM client application 114 to observe, validate, or modify specified account settings for each account in accordance with the user-specific privacy and security preferences for that account (also referred to herein as the "privacy configuration" or "user-specific privacy configuration" for that account). In particular, DPM backend 120 transmits to DPM client application 114 the user 105's list of protected accounts 107 and, for each account, the user 105's corresponding privacy configuration.

With this access mechanism in mind, the disclosure turns now to DPM backend 120. As illustrated, DPM backend 120 includes: an API (Application Programming Interface) 122, an authentication system 124, a database 125, one or more DPM servers 126, and a configuration management system 128. Although represented as discrete components in FIG. 1B, it is appreciated that one or more of the illustrated components of DPM backend 120 can be combined, duplicated, or extended without departing from the scope of the present disclosure. For example, DPM backend 120 could instead be provided with a plurality of databases 125, or configuration management system 128 could be combined with DPM servers 126, all without departing from the scope of the present disclosure.

In general, DPM backend 120 is remotely located from user 105, user computing device 110, and DPM client application 114. For example, DPM backend 120 can be provided by one or more data centers, public and/or private clouds, and other computing facilities as would be appreciated by one of ordinary skill in the art. Moreover, the various constituent components of backend 120 may be co-located with respect to one another, remotely located with respect to one another, or some combination of the two.

Regardless of the precise manner in which the various constituent components of DPM backend 120 are configured, it is contemplated that API 122 provides a mechanism for interaction between DPM client application 114 and DPM backend 120. More specifically, API 122 defines various functions, methods and protocols for communication between DPM client application 114 on one end, and one or more corresponding components of DPM backend 120 on the other end. API 122 can both send and receive data to and from DPM client application 114, and therefore ultimately provides a secure and globally accessible interface to authenticated browsers 112 from DPM backend infrastructure 120.

An authentication system 124 performs authentication and/or verification of entities or components to which backend infrastructure 120 will couple. For example, authentication system 124 can perform authentication of DPM client application 114 (and/or the user computing device 110 on which DPM client application 114 is installed) before permitting DPM client application 114 to access the cached login credentials stored by browser 112, or before permitting DPM client application 114 to begin performing the personal digital privacy and security management of the present disclosure. In some embodiments, authentication system 124 might perform a separate authentication step or process for each discrete user of DPM system 100 and/or each of the protected accounts 107 associated with that discrete user of DPM system 100. Authentication system 124 might also be configured to perform authentication every time that a discrete user of DPM system 100 logs out or times out from DPM system 100. In some embodiments, authentication system 124 can perform authentication, for example, by using a token-based authentication mechanism such as OAuth. If authentication is unsuccessful, authentication system 124 may attempt to perform reauthentication with DPM client application 114. Authentication system 124 can also notify user 105 of the unsuccessful authentication attempt.

One or more DPM servers 126 can receive data, requests, and other communications transmitted by DPM client application 114 via API 122. As will be discussed below, some of these transmission from DPM client application 114 will include status/logging messages, error messages, confirmation messages, user notification messages, etc. that are generated by DPM client application 114 in the course of performing the personal digital privacy and security management of the present disclosure. As illustrated, DPM servers 126 are communicatively coupled to a database 125, which can store activity, received data/communications, operational logs, etc., from the DPM servers 126 as well as from one or more DPM client applications 114 (i.e. the set of all DPM client applications 114 associated with all of the discrete users of DPM system 100). In some embodiments, only certain portions of the activity, received data, and logs from DPM servers 126 and DPM client applications 114 might be stored in database 125, e.g. due to storage space constraints.

In some embodiments, DPM servers 126 can receive browser data that DPM client application 114 retrieves from browser 112 and transmits to DPM servers 126. For example, this browser data might include a browsing history of user 105, which DPM servers 126 can analyze to identify one or more online user accounts that user 105 has recently visited or logged into. Based on this identification, DPM servers 126 can add the identified user accounts to the list of protected user accounts 107 (recalling that the protected user accounts 107 are those to which personal digital privacy and security management is applied to) and/or can transmit a prompt or notification to user 105 enquiring whether or not the user wishes to add the auto-detected account(s) to the user's list of protected online accounts 107.

Configuration management system 128 can be utilized in conjunction with DPM servers 126 to add identified user accounts to the list of protected user accounts 107; to automatically create, modify, update, or delete entries within the list of protected user accounts 107; to create, modify, update, or delete entries within the list of protected user accounts 107 based on specific input(s) received from user 105; and to create, modify, update, or delete user privacy configurations that apply to one or more privacy/security settings of given ones of the protected user accounts 107. In embodiments where user 105 uses configuration management system 128 to create, modify, or delete entries in the list of protected accounts 107, it is contemplated that user 105 can access configuration management system 128 directly; can access configuration management system 128 indirectly through DPM client application 114/browser 112/ user computing device 110; or some combination of the above. Configuration management system 128 can also contain other user records, configuration settings, risk scores, etc. For example, in some embodiments the one or more DPM servers 126 can be used to calculate a risk score corresponding to the user 105, as will later be explained in greater depth with respect to FIG. 4.

Figure 2A:
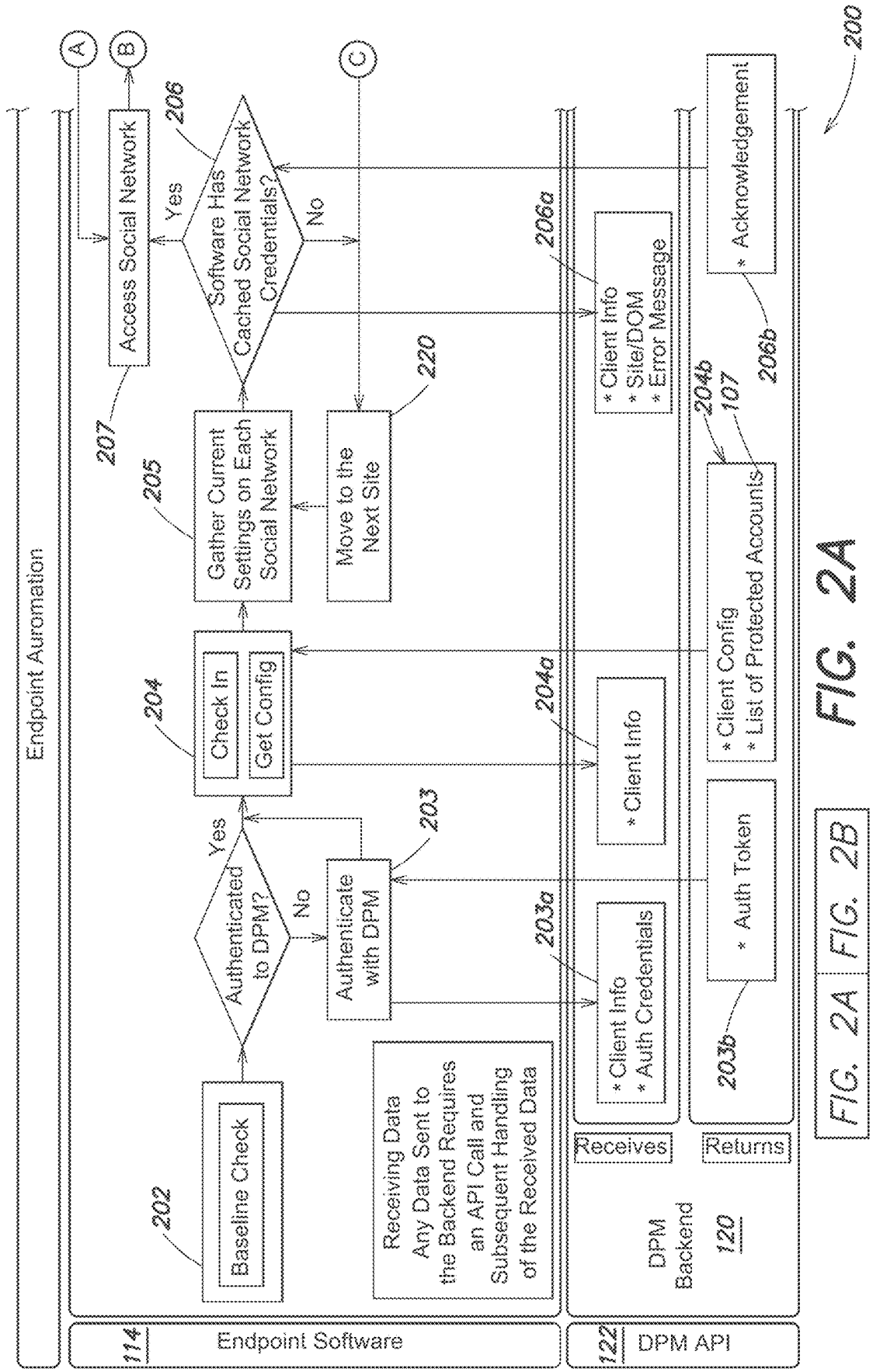
FIG. 2A-B illustrate an example digital privacy management method of the present disclosure.
Figure 2B:
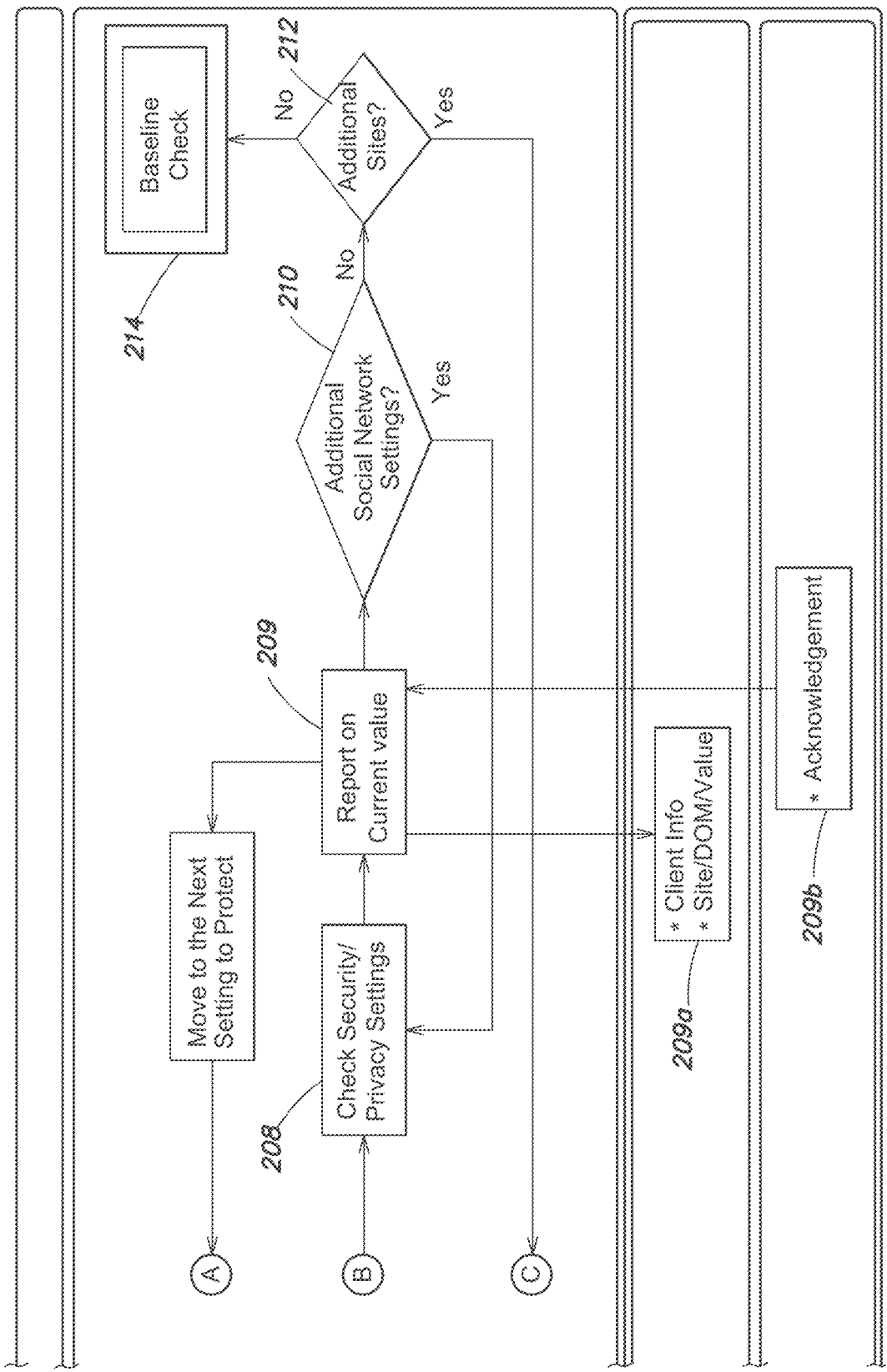

The disclosure turns now to FIGS. 2A-B, which depict an example method 200 of personal digital privacy and security management for a given user. As illustrated, method 200 comprises an endpoint control process (ECP) for the interaction between DPM client application 114 and DPM backend 120. Recalling that API 122 governs the communication and interaction between DPM client application 114 and DPM backend 120, it is appreciated that although not illustrated, DPM backend 120 is coupled to the opposite side of API 122, i.e. such that communications between DPM client application 114 and API 122 are functionally equivalent to communications between DPM client application 114 and DPM backend 120 for purposes of the following discussion.

For purposes of clarity, the following terms are used in the following description of the example method 200 by which DPM backend 120 controls DPM client application 114 to perform the digital privacy management of the present disclosure. These definitions are not to be construed as limiting, as it is understood that they are provided for clarity of explanation with respect to the example of method 200:

"Protected accounts" are the user 105's online accounts which have been selected or registered with DPM backend 120 for digital privacy management;

"Privacy/security settings" are the actual, discrete settings provided by or available within the interface of a given online account;

"Privacy rules" are parameters controlling the operation of DPM backend 120, and are dynamically generated based at least in part on user input;

"Privacy configurations" are the generated by configuration management system 128 and reflect the specific application of 'privacy rules' to the available 'privacy/security settings' of a given online account.

Method 200 begins at a step 202, which performs a baseline check to determine whether or not DPM client application 114 is authenticated to access DPM backend 120. If DPM client application 114 is currently authenticated with DPM backend 120, then method 200 proceeds to a step 204 and performs a check-in process. In some embodiments, DPM client application 114 can use and reuse authentication credentials to connect to DPM backend 120 for check-in at 204, e.g., by storing the authentication credential in memory of user computing device 110 until such time that DPM client application 114 needs the credential in order to authenticate with DPM backend 120.

If DPM client application 114 has not previously been authenticated with DPM backend 120, or if an authentication token/session between the two is present but has expired, then the method proceeds to a step 203 to authenticates or re-authenticate DPM client application 114 with DPM backend 120.

Step 203 consists of two portions, 203a and 203b. At 203a, DPM client application 114 transmits client information and authentication credentials to DPM backend 120. Client information can include identifying data corresponding to one or more of user 105, user computing device 110, internet browser 112, and DPM client application 114. Authentication credentials can comprise one or more tokens, passwords, or other appropriate security credentials for accessing DPM backend 120. For example, the authentication credentials might be established when user 105 first installs DPM client application 114 on his computing device 110, or when user 105 first uses configuration management system 128 to register with DPM backend 120. At 203b, DPM backend 120 transmits an authorization token or other indication of successful authentication back to DPM client application 114.

At this point, user application 114 is successfully authenticated with DPM backend 120, either by virtue of a previously existing authentication or an authentication established at steps 203-203b. After authentication is complete, the method proceeds to step 204, where DPM client application 114 performs check-in and configuration process with DPM backend 120.

At step 204a, DPM application 114 establishes a connection with DPM backend 120 (e.g. using API 122) and performs check-in. This check-in process can include DPM application 114 transmitting client information to DPM backend 120, where the client information uniquely identifies user 105 to DPM backend 120. For example, the client information might allow DPM backend 120 to perform a user lookup of user 105 in database 125, in order to thereby access the list of protected accounts 107 (and the corresponding user-specific privacy configuration(s) for each protected account) that are associated with the user 105.

After check-in is complete, in a step 204b DPM backend 120 returns configuration settings, software updates, or similar updates and optimizations to be applied to DPM client application 114. In embodiments where the client information received in step 204a is used to perform a lookup of user 105 in database 125, DPM backend in step 204b can return one or more results of the user lookup in its transmission to DPM client application 114. In general, the information transmitted by DPM backend 120 in step 204b can include a list of protected accounts 107 that user 105 has registered with DPM backend 120 for privacy management. The transmitted information can further include specific and requested privacy configurations for one or more privacy/ security settings of each protected account 107.

The privacy configuration(s) for each account can be user-specified, pre-defined in DPM backend 120, customized (manually or automatically) at configuration management system 125, or some combination of the above. For example, in some embodiments DPM backend 120 might apply one or more default sets of privacy rules for certain account types or categories, and user 105 can subsequently specify modifications to be made to the default set of privacy rules. These default sets of privacy rules can specify certain scenarios or circumstances that may apply to user 105 and can be applied to privacy/security settings of the user's protected accounts 107 in accordance with the specified scenario or circumstance. In other words, privacy rules translate an identified scenario or circumstance into appropriate commands to cause DPM backend 120 to generate and implement privacy configuration(s) across the disparate privacy/security settings of the disparate protected accounts 107, to thereby achieve a uniform and consistent end result. For example, one default set of privacy rules might correspond to the scenario in which user 105 is in the dating market, such that the dating-scenario privacy rules cause DPM backend 120 to generate privacy configurations for the user's protected accounts 107 such that all privacy/security settings of the protected accounts 107 are configured to minimize account visibility or accessibility to the general public. In some embodiments, privacy rules might only cause DPM backend 120 to generate privacy configurations for a portion of the protected accounts 107. For example, in the context of the above dating-scenario policy rules, these dating-scenario policy rules might only be applied to those protected accounts 107 that are dating accounts (or are identified in the definition of the dating-scenario policy rules as being included in the target space to which the rules will be applied). This variable scope is true of user-specified preferences and modifications input to DPM backend 120 in general, i.e. the user inputs can be applied to all of the accounts in the user's list of protected accounts 107, or only to one or more sub-sets of the accounts in the user's list of protected accounts 107.

One or more of the transmissions of 204a, 204b can be values or tuples. For example, DPM client application 114 can receive values or tuples containing one or more combinations of user identifier, protected account identifier, account/privacy setting identifier, privacy configuration identifier, account privacy/security setting identifier, etc. These identifiers can be associated with one or more data values. For example, the account privacy/security setting identifier can be associated with a data value that represents the expected setting for that account privacy/security setting.

At step 205, DPM client application 114 begins the privacy management cycle by gathering current privacy/security settings for each account in the user's list of protected accounts 107. In order to gather the current privacy/security settings for a given protected account, however, DPM client application 114 must first login to the given protected account as the user 105. For each account on the user's list of protected accounts, the process proceeds as follows:

At 206, DPM client application 114 checks to see if it has access to cached user login credentials for the given account. These cached user login credentials are stored locally on user computing device 110 by browser 112. In some embodiments, DPM client application 114 can interact with browser 112 (e.g. because DPM client application 114 can be a browser extension) to determine if browser 112 currently has an active login session for the given protected account. Notably, user login credentials are not handled or managed directly by DPM client application 114 or DPM backend 120, which thereby provides an additional level of security to user 105 that is interacting with DPM client application 114.

At step 206a, if DPM client application 114 is unable to obtain cached user login credentials for the given protected account, an error flag or other notification can be generated to alert user 105 and/or DPM backend 120 that the given account was not able to be accessed for purposes of performing digital privacy management. An error message comprising information corresponding to user 105, the account in question, and specific error information pertaining to the failure to obtain cached user login credentials for the account in question, is transmitted to DPM backend 120 by DPM client application 114.

At 206b, DPM backend 120 generates and transmits an acknowledgement that the error message from step 206a was received successfully. After DPM client application 114 receives this acknowledgement from DPM 120, the method proceeds to step 220 and looks for the next protected account in the user's list of protected accounts 107. In some embodiments, although the method moves on to the next protected account 107 in the user's list, DPM client application 114 can be configured to continue to contact or attempt to login to the protected account that failed in step 206a. Such attempts can continue until a timeout is reached or the account has been successfully logged into and updated by DPM client application 114.

However, if DPM client application 114 is able to successfully obtain cached user login credentials for the given protected account in step 206, then the method proceeds to step 207. At step 207, in response to successfully obtaining (at step 206) cached user login credentials for the given protected account, DPM client application 114 then uses the obtained user login credentials to access the given protected account. In other words, DPM client application 114 logs in to the given protected account as the user 105.

At 208, DPM client application 114 then checks the current status of one or more security and/or privacy settings that are configurable for the given protected account. In some embodiments, DPM client application checks the current status of one security/privacy setting of the protected account at a time. In this manner, DPM client application 114 can query each of the user's protected accounts 107 and evaluate whether individual privacy/security settings for that protected account are correctly configured, e.g. per the user-specific privacy configuration(s) for that account. Recall that the user-specific privacy configuration(s) for a protected account can be stored in or generated by configuration management system 128 and subsequently transmitted to DPM client application 114 by DPM backend 120 at step 204b.

At 209, DPM client application 114 reports on the current status of the security/privacy setting(s) detected in 208. In response to a mismatched setting in a protected account, the DPM client application 114 can automatically set the value according to the privacy configuration(s) corresponding to that particular user 105, that particular protected account 107, and that particular security/privacy setting. These privacy configuration(s) are stored in or generated by configuration management system 128 and can be received by DPM client application 114 in step 204b.

At step 209a, a current status report is transmitted to DPM backend 120. As illustrated, the current status report can include, but is not limited to, client information and a data object indicating the protected account, the security/privacy setting(s), and the corresponding value(s) for each security/privacy setting.

At 209b, DPM backend 120 transmits an acknowledgement to DPM client application 114 indicating that the status report was received. As mentioned above, if one or more of the security/privacy settings are incorrect, then DPM client application 114 can update the incorrect security/privacy settings to the correct value as specified by the appropriate privacy configuration(s) for the incorrect security/privacy settings. In some embodiments, the determination that a security/privacy setting is incorrect can be made remote from DPM client application 114 and transmitted by DPM backend 120 (e.g. by including the notice of the incorrect setting in the transmission from DPM backend 120 at step 209b). The determination that a security/privacy setting is incorrect can be made locally by DPM client application 114 by comparing the current status of the setting, as detected in step 208, to the expected status of the setting, as obtained from the corresponding privacy configuration for the setting. In some embodiments, DPM client application 114 might determine that the given protected account 107 requires additional user input (e.g., to save settings) before continuing, in which case DPM client application 114 can prompt user 105 and proxy the resulting user input to the protected account before saving the configuration settings and proceeding to step 210.

At step 210, after receiving acknowledgement from DPM backend 120, DPM client application 114 checks to see if there are any additional security/privacy settings that need to be checked for the given protected account. If there are remaining security/privacy settings that still need to be checked, then the method returns to step 208, moves to the next setting to be checked, and repeats steps 208-210.

At step 212, if there are no remaining security/privacy settings that still need to be checked for the given protected account, then the process determines whether there are any additional accounts on the user's list of protected accounts 107 that have not yet been checked. If there are additional accounts on the user's list of protected accounts that have not yet been checked, then the method returns to step 220, moves to the next account on the user's list of protected accounts, and repeats the process described above starting at step 205.

At step 214, if there are no additional accounts on the user's list of protected accounts that still need to be checked, then the baseline check is complete and the method may exit.

While performing any process, step, or portion of method 200, it is contemplated that the DPM client application 114 can send status information (e.g., including, but not limited to, success or failure messages or alerts) to the DPM backend 120. For example, such a transmission of status information could be performed in combination with step 209, or various other steps in which DPM client application 114 transmits information to DPM backend 120 via API 122. The actions above and the privacy management for user 105 can be repeated as desired by returning to step 202. In some embodiments, DPM backend 120 might control DPM client application 114 to perform the user privacy management process in a pre-determined interval, e.g. every week, every month, etc. User 105 can manually initialize or request that the privacy management process be performed, e.g. by providing an input into DPM client application 114. In some embodiments, DPM backend 120 might cause DPM client application 114 to perform the user privacy management process in response to the user 105 making one or more preference changes at configuration management system 128.

Figure 3B:
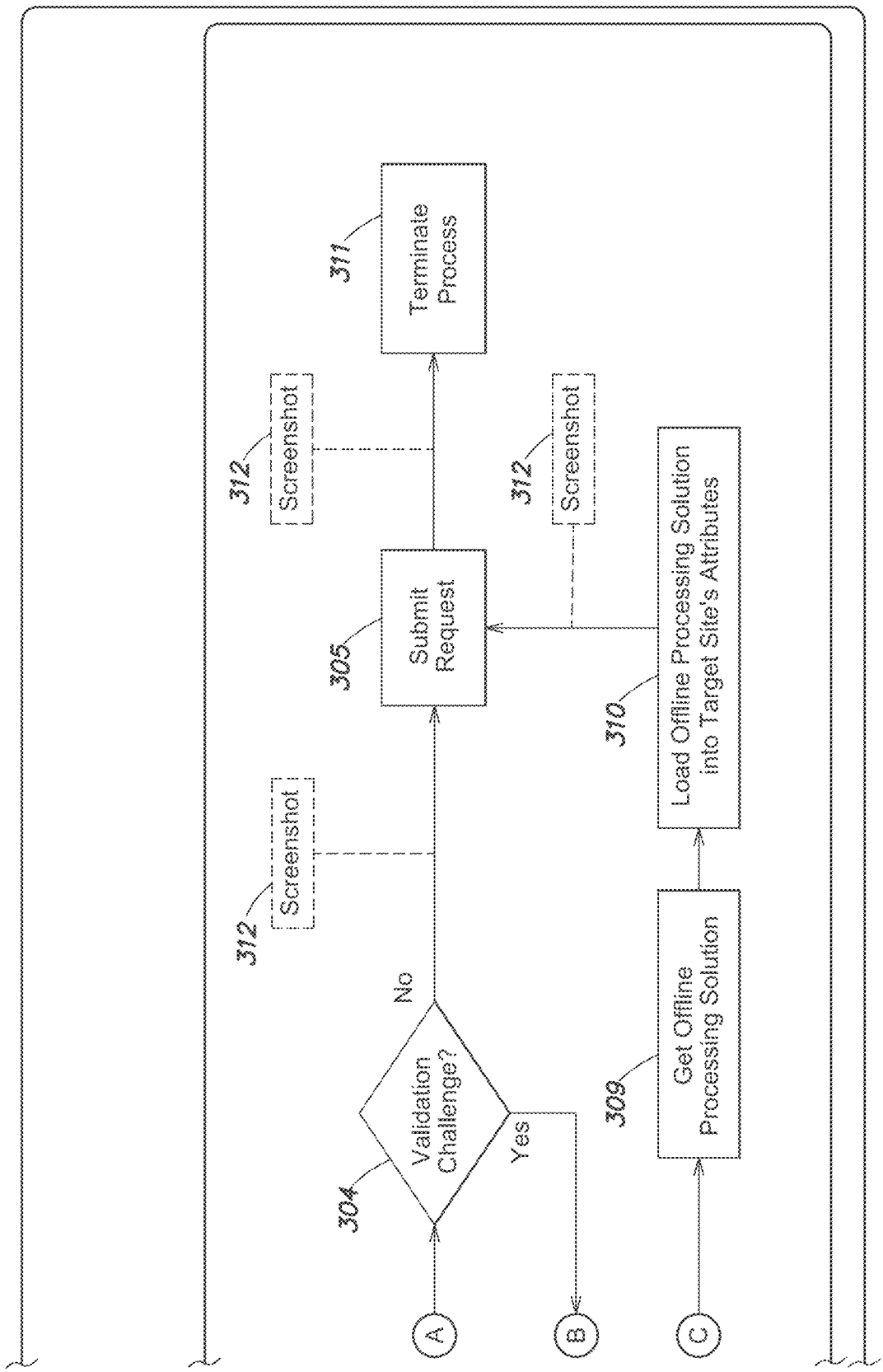

FIGS. 3A-B depict a second example method 300 for management of personal digital privacy. In particular, as illustrated method 300 provides an automated process for service opt-out. For example, service opt-outs can include options for a user to remove or opt-out from an online data broker platform (such as an advertiser, marketer, tracker, etc.).

Method 300 for management of personal digital privacy begins at a step 301, which initializes web automation tools such as web drivers or other such custom developed web frameworks.

At a step 302, the web automation software can initialize and connect to an opt-out application located on a data broker's website (as was navigated to in step 301). The manner in which the initialization of the opt-out application is performed is configured and initiated by the DPM (e.g. DPM backend 120). In some embodiments, the initialization and connection can occur after a notification is received from the DPM.

Before (or concurrent with) proceeding to a step 303, one or more screenshots of a virtual browser image can be captured in an intermediate step 312. These screenshots can be stored and/or transmitted to the DPM for debugging, digital analysis, or documentation of a successful service operation. In some embodiments, image recognition can be applied to one or more of the screenshots captured by the intermediate process 312, where the extracted data from the image recognition process can be used as an additional input into the subsequent steps of method 300 that are described below.

In a step 303, the method loads appropriate client information data into the corresponding attributes or fields of the target data broker from step 302. In doing so, method 300 can account for each opt-out application's unique process workflow, including application navigation, anticipating required submission data, the expected format of that information, and other such interactions. For example, to opt-out of a service, an opt-out application might require client information data which incudes, but is not limited to, first or last name, address, email, phone, browser fingerprint or other such info. An example of this requisite client data corresponding to the given opt-out application is illustrated in FIG. 3A at 313. In some embodiments, the screenshot(s) captured by intermediate step 313 can be used to perform image recognition and analyze the opt-out application to dynamically or in real-time identify all of the requisite client information data 313 for the opt-out application. In some embodiments, the requisite client information data 313 can be retrieved from database 125 of DPM backend 120, e.g., if the user has previously registered with DPM backend 120. Step 303 concludes when the requisite client information data 313 has been associated with the corresponding opt-out application attributes.

In some scenarios, an opt-out application can require clients to solve a validation challenge. Validation challenges can include, but are not limited to, the provision of an email with link validation, a phone call with a PIN, or other such methods to authenticate the opt-out process.

A step 304 determines whether or not a validation challenge is presented by the opt-out application. In response to a determination that a validation challenge is present, a sub-routine begins to solve the validation challenge, which advantageously can be performed without requiring interaction, knowledge, or awareness on behalf of the client. The sub-routine for a validation challenge is described below with respect to steps 306-310. If no validation challenge is present, then the sub-routine is not performed and method 300 proceeds directly to step 305.

At a step 306, the validation challenge sub-routine begins by identifying the attributes and type of challenge presented by the given validation challenge, and then subsequently retrieves the validation challenge itself or a link to the validation challenge.

At a step 307, an encoded image or encoded version of the validation challenge is extracted from the output of step 306. The encoded image of the validation challenge is then transmitted for offline processing. In some embodiments, offline processing can be performed manually. In some embodiments, offline processing can be performed by a neural network or machine learning algorithm. Additionally, one or more screenshots captured by the supplemental screenshot step 312 can be used to aid the offline processing of the encoded image of the validation challenge.

At a step 308, a determination is made whether or not the offline processing of the encoded image of the validation challenge was successful. In some embodiments, this polling process can run continuously, or can wait for a pre-determined delay period before polling. In some embodiments, step 308 could receive a push notification when offline processing is complete (successful or unsuccessful) such that active polling is not needed.

At a step 309, in response to receiving an indication that the offline processing of the encoded image of the validation challenge was successful, the solution or output of offline processing can be retrieved for submission. In some embodiments, where offline processing is performed manually, a successful indication will not be received until a consensus solution is achieved. That is, offline processing involves submitting the encoded image of the validation challenge to multiple processors and waiting until a plurality solution is received (e.g. 2/3 processors with same solution, 4/7 processors with same solution, but not 3/7 processors with same solution).

At a step 310 the consensus solution/solved validation challenge is loaded into the web form of the opt-out application (in addition to the already populated fields from step 303). As before, one or more screenshots can be captured by supplemental screenshot process 312 for purposes such as logging and validation of working challenge solving procedures in the validation challenge sub-routine provided by steps 306-310.

At a step 305, the web form can be submitted to the opt-out provider or data broker.

At a step 311, once the screenshot of step 312 has been received and the submission of step 305 has been completed, method 300 can terminate and wait for the next instantiation from the DPM backend 120.

In some embodiments, the management and configuration of personal digital privacy and security of the present disclosure can include a security and privacy risk framework (RF). In some examples the RF can also include generating and providing risk scores to one or more users, such as user 105, a user of method 200, a user of method 300, etc. The RF can contain the following components:

a. Actions can represent specific controls that a user can implement, configure, or take advantage of with the possible effect of improving their security and privacy posture (e.g., Multi-Factor Authentication, device screen lock, etc.).

b. Action Values can be a subjective or objective measure of the impact (theoretical or otherwise) of a user performing a given security or privacy action relative to the value of other Actions (e.g., a relative scale of 1-10, binary High or Low, etc.).

c. Threat Models can represent a user profile that can identify possible causes of damage to a user's security or privacy posture. A threat model is subjective based on the user's perceived risks (e.g., digital exposure, occupational hazards, etc.) and measured risks (IPC and DPM findings, identified vulnerabilities, qualitative assessment questions, etc.).

d. Domains can be a classification system for Threat Models to group security and privacy Actions (for example Operational, Network, Privacy, etc.)

e. Risk Scores can be represented by plotting, measuring, or otherwise combining the collective Action Values for all implement Actions per user on a per Domain or per Threat Model basis.

Threat models can be identified and associated with a user to create a profile. The RF can then measure the users' compliance with a list of recommended actions. Domains can offer value by differentiating the types of threats to a users' model. This can also allow classification of actions based on their relevance to the Domains and thus the Threat Model. The RF can derive security and privacy risk scores (RS) based on the action values as weighed against their relativity to the user's threat model or through other empirical means.

Figure 4:
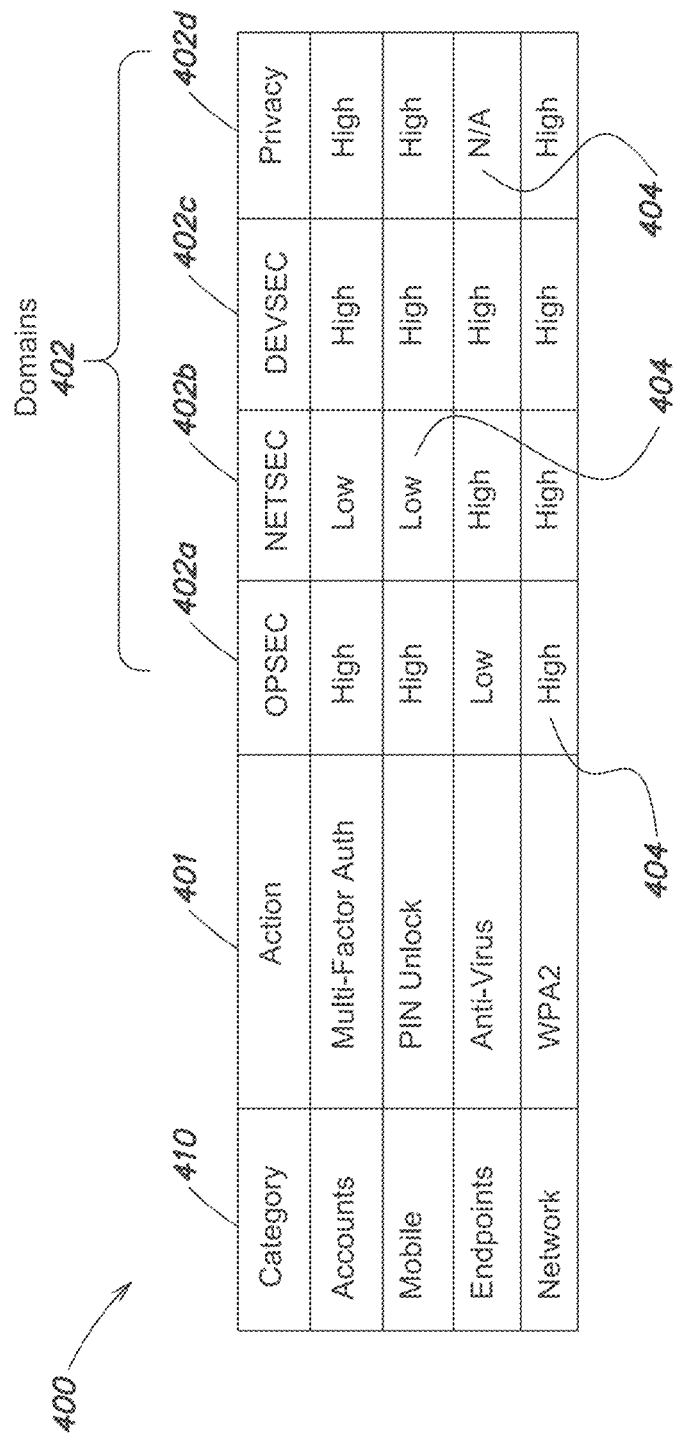
FIG. 4 depicts a table illustrating example domains, categories, and values used to determine a security and privacy risk score.

FIG. 4 presents a table 400 illustrating example domains, categories, and values used to determine a security and privacy risk score according to embodiments of the present disclosure. User privacy categories 410 represent different aspects of the user's digital life in which actions 401 may be present. As shown in table 4, user privacy categories 410 include Accounts, Mobile, Endpoints, and Network. The actions 401 can be mapped to four protective domains 402, which include OpSec (Operational Security) 402a, NetSec (Network Security) 402b, DevSec (Device Security) 402c, and Privacy 402d. The protective domains 402 can represent unique areas that can be improved depending on the action 401 that is taken by the user. Some actions can impact one or multiple protective domains 402. In general, the OpSec protective domain 402a can represent the category of actions that can be completed to improve operational security. Operational security can be the process of evaluating decisions and actions in accordance with how an adversary could use that action or outcome against an individual, and moreover can include taking appropriate actions to reduce the risk of such exploitation by an adversary. The NetSec protective domain 402b can represent actions that can be categorized as helping to improve network security. For example, the action of enabling a personal firewall on a laptop PC would improve the NetSec score for an individual or user. Similarly, the DevSec protective domain 402c pertains to device security and can represent a domain of actions that can improve the security of a user's personal device. For example, enabling a relatively complex PIN on a mobile phone would improve the DevSec score, while disabling any screen or device lock would lower the DevSec score. The Privacy protective domain 402d can represent actions that can be used to improve a user's online privacy, for example as discussed with respect to the DPM (Digital Privacy Manager) of FIG. 1A-B. For example, preventing public indexing of social media accounts would increase the privacy domain category score. In some embodiments, logging data stored in the DPM backend 120 of FIG. 1B can be used to supplement or inform the calculation of the Privacy domain 402d, e.g. based on factors such as the frequency with which DPM backend 120 runs the privacy management method 200 for the user, the number of protected vs. unprotected online accounts the user has, the number of changes that DPM backend 120 has had to make to the user's privacy/security settings in their protected online accounts, etc.

Returning to the discussion of FIG. 4, table 400 illustrates risk score calculations where, for example, the values 404 for each completed or proposed action 401 within a user privacy category 410 could be classified as LOW or HIGH. In some embodiments, the calculation of the net risk score for a user based on table 400 could involve the conversion of LOW and HIGH values into numerical point values, e.g. LOW is worth one point and HIGH is worth two points, etc. In some examples, a non-applicable action counts for no points. Running a client's completed list of actions through the formula (which weights answers by the objective value 404) yields a point total per category and when tallied together, a total risk score.

Figure 5:
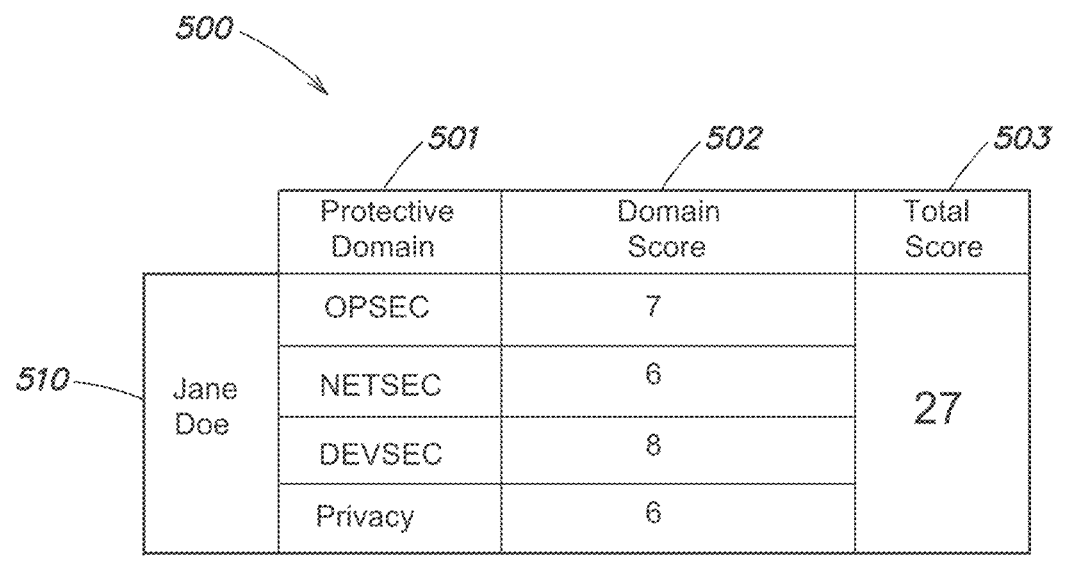

FIG. 5. shows a sample table 500 that depicts a risk score calculation for an example user 510. For each user 510, the constituent protective domains included in their risk score calculation are indicated at 501. For each protective domain 501, a domain-specific risk score component 502 is indicated. Based on the domain-specific risk score components 502, a total risk score 503 is presented to the user 510 as their calculated risk score. In some examples, the risk score 503 can be determined using weighted values (β) mapped to score values (X) and categories (j) as shown in equation (1):

$$\text{Score} = X\beta = \sum_{j=1}^{P} X_j \beta_j \qquad (1)$$

Accordingly, FIG. 5 illustrates a protective domain concept and example security and privacy score. For example, Risk (Total) Score 503 can be the sum of one or more implemented actions across alone or more protective domains 501. Domain Score 503 can be the combined value of one or more implemented actions for a specific domain 501 (e.g., OPSEC, NETSEC, DEVSEC, PRIVACY, etc.) scored with a weighted control value of the actions (e.g., as illustrated in FIG. 4).

Figure 6:
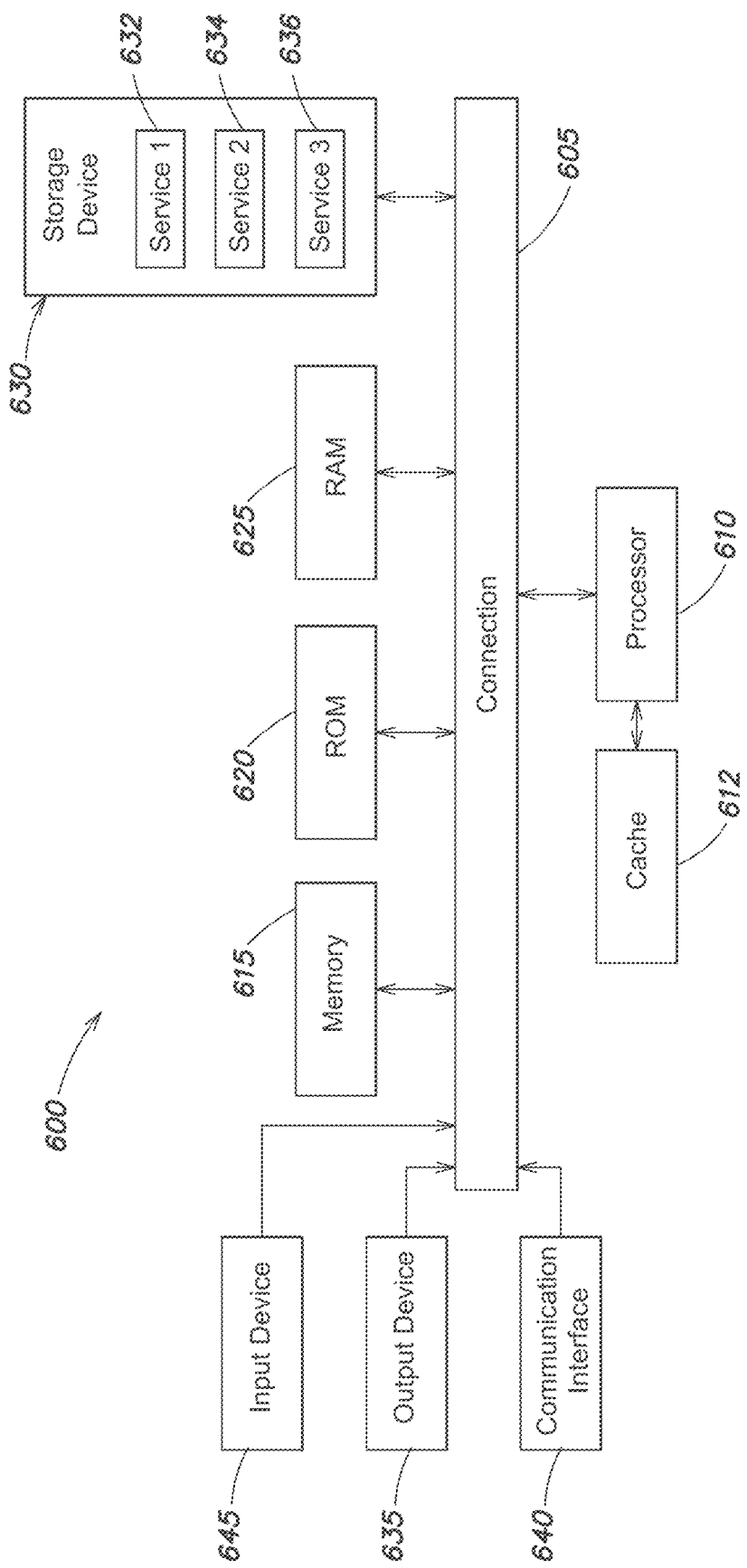
FIG. 6 depicts an example computer system architecture.

FIG. 6 shows an example computing system 600 in which aspects of the present disclosure may be implemented or provided. In computing system 600, various components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, or source code. Examples of computer-readable media that may be used to store instructions, information used, and/or information created during methods according to described examples include magnetic or optical disks, flash memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
receiving, from a client authenticated application provided on a computing device of a user, a list of one or more protected accounts, wherein each protected account is an online user account associated with user;
for each protected account from the list of protected accounts:
generating a privacy configuration, wherein the privacy configuration is generated based at least in part on one or more user-specific privacy rules;
accessing a login session for the protected account, wherein accessing the login session includes:
detecting, with the authenticated client application, a cached account credential corresponding to the protected account, wherein the cached account credential and the authenticated client application are located on the computing device of the user; and
causing the computing device of the user to establish the login session for the protected account based on the detected cached account credential;
based on the accessed login session for the protected account, determining a plurality of current status indicators for a plurality of privacy settings associated with the protected account;
analyzing the plurality of current status indicators to generate updated configuration settings for one or more of the privacy settings associated with the protected account; and
using the login session for the protected account, applying the updated configuration settings to the protected account.

2. The method of claim 1, wherein:
the cached account credential is stored on the computing device of the user by an internet browser; and
the authenticated client application is a browser extension compatible with the internet browser.

3. The method of claim 1, where generating a privacy configuration comprises:
obtaining, for each protected account from the list of protected accounts, a set of controllable privacy settings associated with the protected account; and
generating, for each controllable privacy setting of the set of controllable privacy settings, a setting-specific privacy configuration.

4. The method of claim 3, further comprising using the setting-specific privacy configurations to determine the plurality of current status indicators for the plurality of privacy settings associated with the protected account.

5. The method of claim 1, further comprising calculating a risk score for the user, wherein the risk score is based on a plurality of action values calculated for one or more user security domains.

6. The method of claim 5, wherein a first user security domain is a privacy domain, and the plurality of action values for the privacy domain are calculated based at least in part on the accessed login session for the protected account and the determination of current status indicators.

7. The method of claim 5, wherein a second user security domain is a device security domain, and the plurality of action values for the device security domain are calculated based at least in part on device-specific data received from the client application provided on the computing device of the user.

8. The method of claim 1, further comprising transmitting a login prompt to the client application provided on the computing device of the user, the login prompt transmitted in response to a failure to access the login session for a given protected account, where the login prompt causes the client application to display a request for the user to login to the given protected account on the computing device.

9. At least one non-transitory medium having stored therein instructions which, when executed by one or more processors cause the one or more processors to perform actions comprising:
receiving, from a client authenticated application provided on a computing device of a user, a list of one or more protected accounts, wherein each protected account is an online user account associated with user;
for each protected account from the list of protected accounts:
generating a privacy configuration, wherein the privacy configuration is generated based at least in part on one or more user-specific privacy rules;
accessing a login session for the protected account, accessing the login session includes:
detecting, with the authenticated client application, a cached account credential corresponding to the protected account, wherein the cached account credential and the authenticated client application are located on the computing device of the user; and
causing the computing device of the user to establish the login session for the protected account based on the detected cached account credential;
based on the accessed login session for the protected account, determining a plurality of current status indicators for a plurality of privacy settings associated with the protected account;
analyzing the plurality of current status indicators to generate updated configuration settings for one or more of the privacy settings associated with the protected account; and
using the login session for the protected account, applying the updated configuration settings to the protected account.

10. The non-transitory medium of claim 9, wherein:
the cached account credential is stored on the computing device of the user by an internet browser; and
the authenticated client application is a browser extension compatible with the internet browser.

11. The non-transitory medium of claim 9, wherein the instructions cause the one or more processors to generate a privacy configuration by:
obtaining, for each protected account from the list of protected accounts, a set of controllable privacy settings associated with the protected account; and
generating, for each controllable privacy setting of the set of controllable privacy settings, a setting-specific privacy configuration.

12. The non-transitory medium of claim 11, wherein the instructions further cause the one or more processors to use the setting-specific privacy configurations to determine the plurality of current status indicators for the plurality of privacy settings associated with the protected account.

13. The non-transitory computer medium of claim 9, wherein the instructions further cause the one or more processors to calculate a risk score for the user, wherein the risk score is based on a plurality of action values calculated for one or more user security domains.

14. The non-transitory computer medium of claim 13, wherein a first user security domain is a privacy domain, and the plurality of action values for the privacy domain are calculated based at least in part on the accessed login session for the protected account and the determination of current status indicators.

15. The non-transitory computer medium of claim 14, wherein a second user security domain is a device security domain, and the plurality of action values for the device security domain are calculated based at least in part on device-specific data received from the client application provided on the computing device of the user.

16. The non-transitory computer medium of claim 9, wherein the instructions further cause the one or more processors to transmit a login prompt to the client application provided on the computing device of the user, the login prompt transmitted in response to a failure to access the login session for a given protected account, where the login prompt causes the client application to display a request for the user to login to the given protected account on the computing device.

17. A system comprising:
one or more processors; and
a memory having stored therein instructions which, when executed by the one or more processors cause the one or more processors to perform actions comprising:
receiving, from a client authenticated application provided on a computing device of a user, a list of one or more protected accounts, wherein each protected account is an online user account associated with the user;
for each protected account from the list of protected accounts:
generating a privacy configuration, wherein the privacy configuration is generated based at least in part on one or more user-specific privacy rules;
accessing a login session for the protected account, accessing the login session includes:
detecting, with the authenticated client application, a cached account credential corresponding to the protected account, wherein the cached account credential and the authenticated client application are located on the computing device of the user; and
causing the computing device of the user to establish the login session for the protected account based on the detected cached account credential;
based on the accessed login session for the protected account, determining a plurality of current status indicators for a plurality of privacy settings associated with the protected account;
analyzing the plurality of current status indicators to generate updated configuration settings for one or more of the privacy settings associated with the protected account; and
using the login session for the protected account, applying the updated configuration settings to the protected account.

18. The system of claim 17, wherein:
the cached account credential is stored on the computing device of the user by an internet browser; and
the authenticated client application is a browser extension compatible with the internet browser.

19. The system of claim 17, wherein the instructions cause the one or more processors to generate a privacy configuration by:
obtaining, for each protected account from the list of protected accounts, a set of controllable privacy settings associated with the protected account; and
generating, for each controllable privacy setting of the set of controllable privacy settings, a setting-specific privacy configuration.

20. The system of claim 19, wherein the instructions further cause the one or more processors to use the setting-specific privacy configurations to determine the plurality of current status indicators for the plurality of privacy settings associated with the protected account.

* * * * *